US005476316A

United States Patent [19]

Batroney et al.

[11] Patent Number: 5,476,316
[45] Date of Patent: Dec. 19, 1995

[54] ELECTRONIC EQUIPMENT CABINET WITH IMPROVED DOOR

[75] Inventors: Stephen J. Batroney, Parsippany Township, Morris County; Harry R. Stoller, Jefferson Township, Morris County; Brian E. Underwood, East Hanover Township, Morris County, all of N.J.

[73] Assignee: AT&T Corp., Murray Hill, N.J.

[21] Appl. No.: 174,567

[22] Filed: Dec. 28, 1993

[51] Int. Cl.$^6$ ...................................................... A47B 81/00
[52] U.S. Cl. ............................ 312/287; 312/100; 49/386; 49/401
[58] Field of Search ........................ 312/100, 220, 312/217, 222, 223.1, 223.2, 229, 287, 325, 328, 319.2; 49/381, 386, 394, 319, 401; 16/289, 306, 349; 361/756

[56] References Cited

U.S. PATENT DOCUMENTS

| | | | |
|---|---|---|---|
| 1,715,538 | 6/1929 | Dean et al. | 312/325 X |
| 2,486,036 | 10/1949 | Lacor | 312/287 |
| 3,379,481 | 4/1968 | Fisher | 312/100 |
| 3,479,104 | 11/1969 | Kobryner | 312/100 X |
| 3,617,814 | 11/1971 | Stanback | 312/100 X |
| 3,724,134 | 4/1973 | Verdone . | |
| 3,896,595 | 7/1975 | Anghiretti et al. | 49/386 X |
| 3,912,348 | 10/1975 | Seymour | 49/476.1 X |
| 4,064,595 | 12/1977 | Leaver | 49/401 X |
| 4,288,134 | 9/1981 | Knaack et al. | 312/100 X |
| 4,435,027 | 3/1984 | Prather et al. | 312/100 X |
| 4,593,493 | 6/1986 | Naka et al. | 49/401 X |
| 4,665,654 | 5/1987 | Stedron et al. | 49/401 X |
| 4,726,634 | 2/1988 | Dewees et al. | 312/100 |
| 4,845,905 | 7/1989 | Frank | 49/386 X |
| 4,899,420 | 2/1990 | Bye et al. | 16/289 |
| 4,949,218 | 8/1990 | Blanchard et al. . | |
| 5,032,954 | 7/1991 | Juza | 361/756 |
| 5,150,277 | 9/1992 | Bainbridge et al. . | |

Primary Examiner—Kenneth J. Dorner
Assistant Examiner—Rodney B. White
Attorney, Agent, or Firm—Lester H. Birnbaum

[57] ABSTRACT

A cabinet housing electronic equipment which utilizes a door mounted to hydraulic lifts and a door stay to keep the door from closing if the lifts fail. Special troughs are also provided to protect craftspeople during a rainstorm and to keep water from electronic equipment and areas where it might cause the door to freeze shut.

9 Claims, 6 Drawing Sheets

ELECTRONIC EQUIPMENT CABINET WITH IMPROVED DOOR

BACKGROUND OF THE INVENTION

This invention relates to cabinets for housing electronic equipment. Digital Loop Carrier Transmission Systems, such as the Subscriber Loop Carrier (SLC®) System, typically include remote terminals which are installed at strategic outdoor locations to provide telecommunication services to several hundred subscribers each. These terminals include several shelves of sophisticated electronic equipment which must be protected from the elements and should be serviced on a regular basis.

In order to provide access to the equipment, the cabinets usually include double doors which pivot horizontally on hinges at opposite ends of at least one face of the cabinet (see, e.g., U.S. Pat. No. 5,150,277 issued to Bainbridge et at.). Since the doors swing out, such cabinets required an easement from the property owner which is much larger than the size of the cabinet itself. Further, there is generally no protection for the craftsperson working on the electronics during a rainstorm or snowstorm. Water from such a storm would also collect at the interfaces of the door and cabinet and cause the door to freeze shut. At least one suggestion provides for an overhanging top to prevent water from dripping into the cabinet (see U.S. Pat. No. 4,949,218 issued to Blanchard et al.).

SUMMARY OF THE INVENTION

The invention is a cabinet including a door for providing access to the interior thereof. The door is mounted to a top portion of a door frame mounted to the cabinet so as to open in an essentially vertical direction. Mounted to the door is at least one hydraulic member which extends in length when the door is in an opened position to assist in opening the door and provides resistance to the closing of the door. Also mounted to the door is a door stay which also extends in length as the door is opened and is latched in at least one position corresponding to a selected angle of the door to the frame so as to prevent the door from closing in the event that the resistance provided by the hydraulic member is insufficient to keep the door at that angle.

BRIEF DESCRIPTION OF THE DRAWINGS

These and other features of the invention are delineated in detail in the following description. In the drawings.

It will be appreciated that, for purposes of illustration, these figures are not necessarily drawn to scale.

DETAILED DESCRIPTION OF THE EMBODIMENT

The cabinet, 10, includes a top portion, 11, at least one side portion, 12, front and back portions, 17 and 18, and a pair of doors, 13 and 19, which in their closed positions protect the electronic components in the cabinet from the elements and in their opened positions (shown in FIG. 2) provide access to those components by a craftsperson.

The electronic equipment protected by the cabinet includes at least one bank, 14, of circuit packs, 15, mounted in shelves, 16. Although not shown, multiple banks can be mounted within a cabinet. It will be appreciated that the full number of shelves, as well as other standard components in a remote terminal cabinet, such as protector blocks, power components, fans and wiring have been omitted for the sake of clarity in the illustration.

Door frames, 20 and 21, which include the doors, 13 and 19, respectively, are mounted on the front and back surfaces typically by nuts and bolts. As illustrated in the more detailed view of a portion of the door frame, 20, in FIG. 6 (where the door has been removed for illustrative purpose), each door, 13, is mounted to a top portion, 25, of the frame by means of one or more hinges, 22. It will be noted that the hinge is set back from the front of the frame, typically, by an amount of approximately 11 cm.

Figure 1:
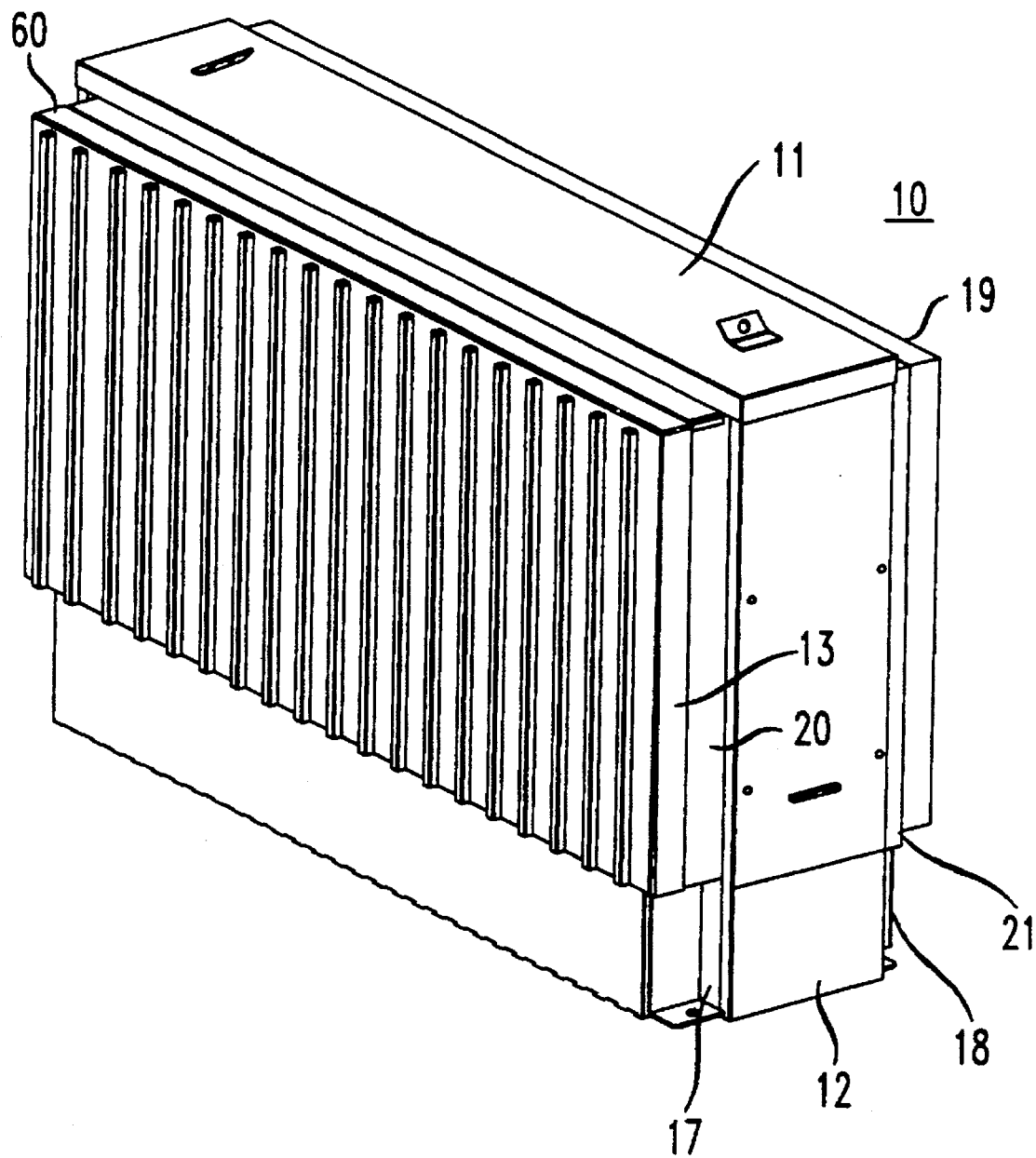
FIGS. 1 and 2 are perspective views of a cabinet in accordance with an embodiment of the invention with doors in a closed and opened position, respectively.
Figure 2:
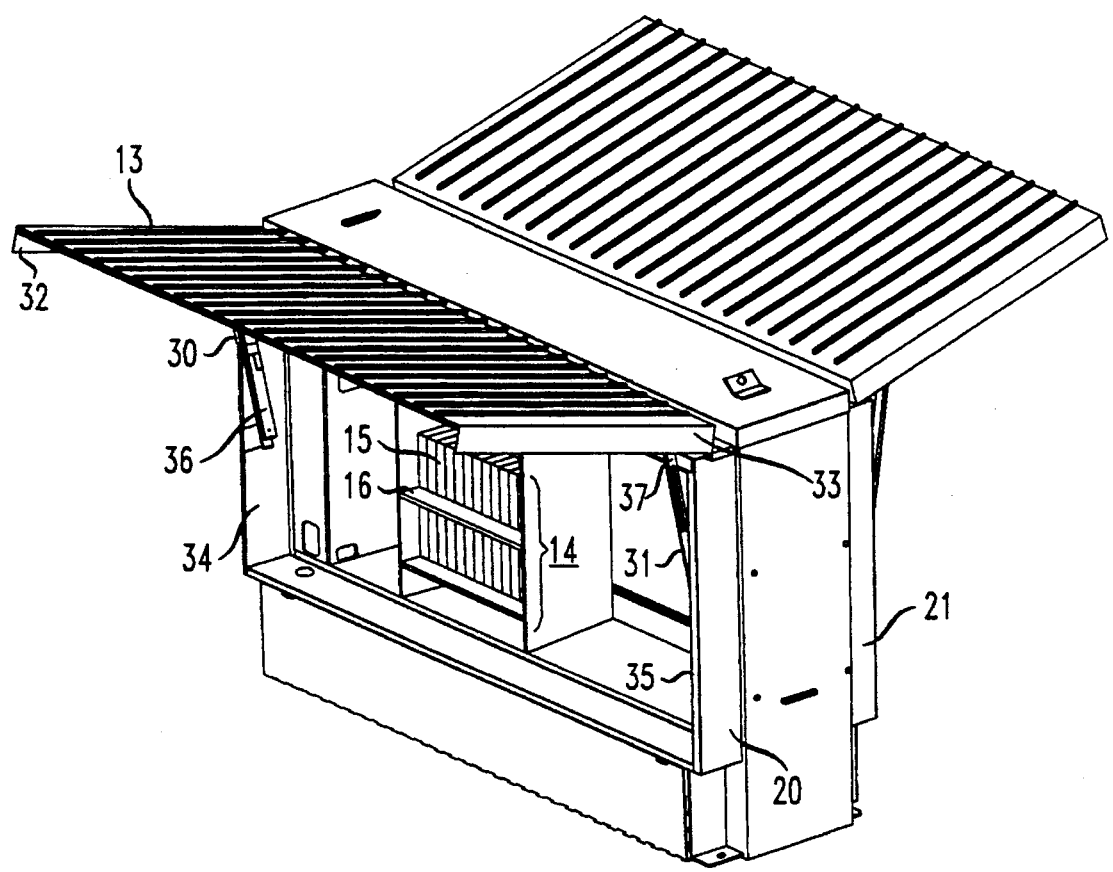
Figure 6:
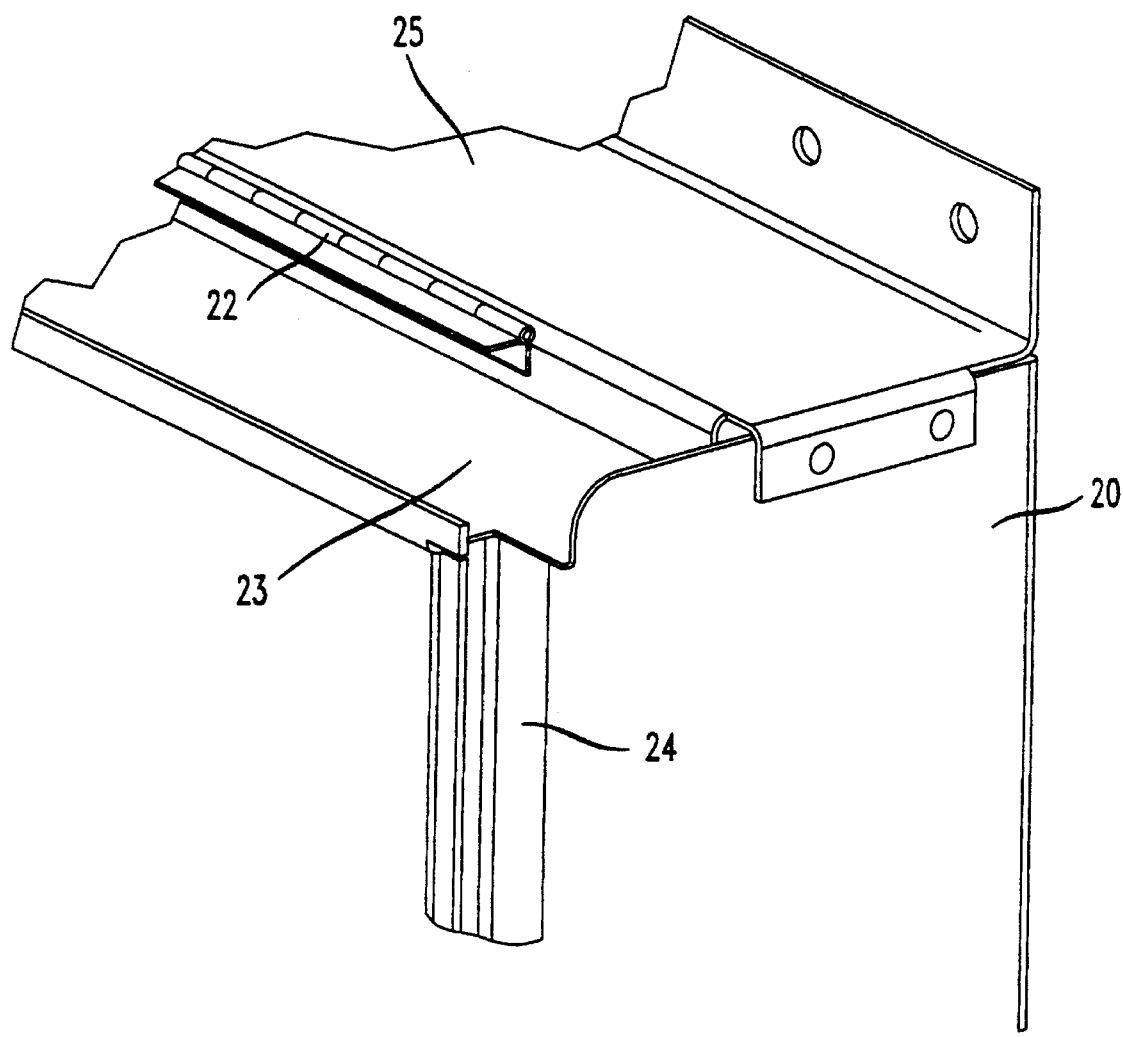
FIG. 6 is a more detailed view of a portion of the cabinet illustrated in FIGS. 1–4.

Thus, from the closed position of FIG. 1, each door, 13 and 19, can be lifted outward and upward to the positions shown in FIG. 2 in order to provide access to the electronic components. By providing a door which opens vertically rather than horizontally, no additional room beyond the sides, 12, is needed for the cabinet. Also, the door can serve to protect the craftsperson during a storm. It will also be appreciated that since the hinge, 22 of FIG. 6, is set back from the front of the frame, the door provides ample head room while only lifted to an angle of approximately 105 degrees from the front of the frame and while controlling the run-off of water during a storm. That is, referring again to FIG. 6, water hitting the opened door will tend to fall into a trough, 23, formed at the top portion of the frame and run down the sides of the frame in trough 24. The water is thereby carried away from the exposed front portion of the frame where the door seals the cabinet in its closed position.

This controlled run-off also helps to prevent the door from later freezing shut due to moisture in the areas between the door and the frame.

Figure 3:
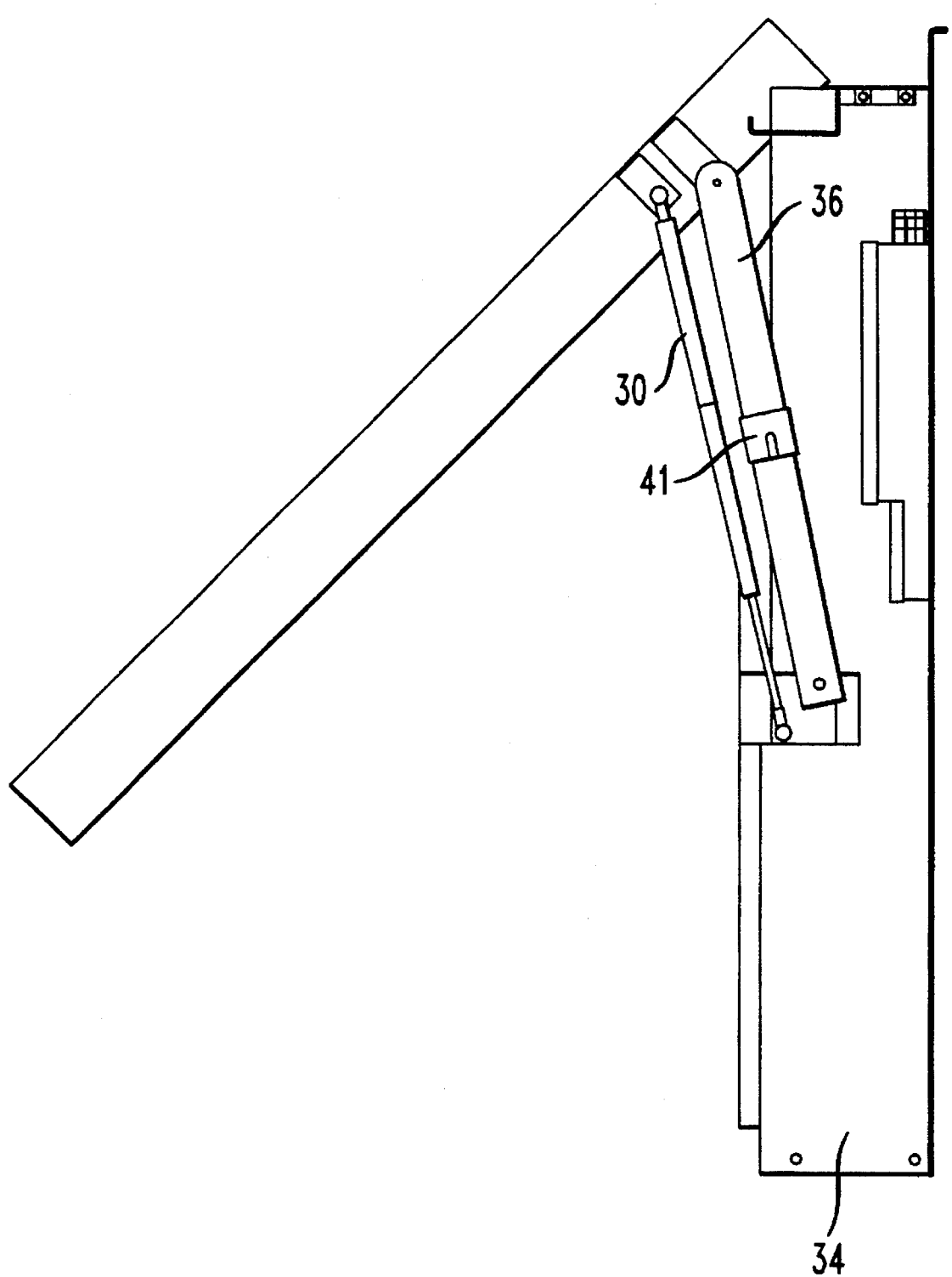
FIGS. 3 and 4 are side views of a portion of the cabinet showing a door at a partially opened and fully opened position, respectively.
Figure 4:
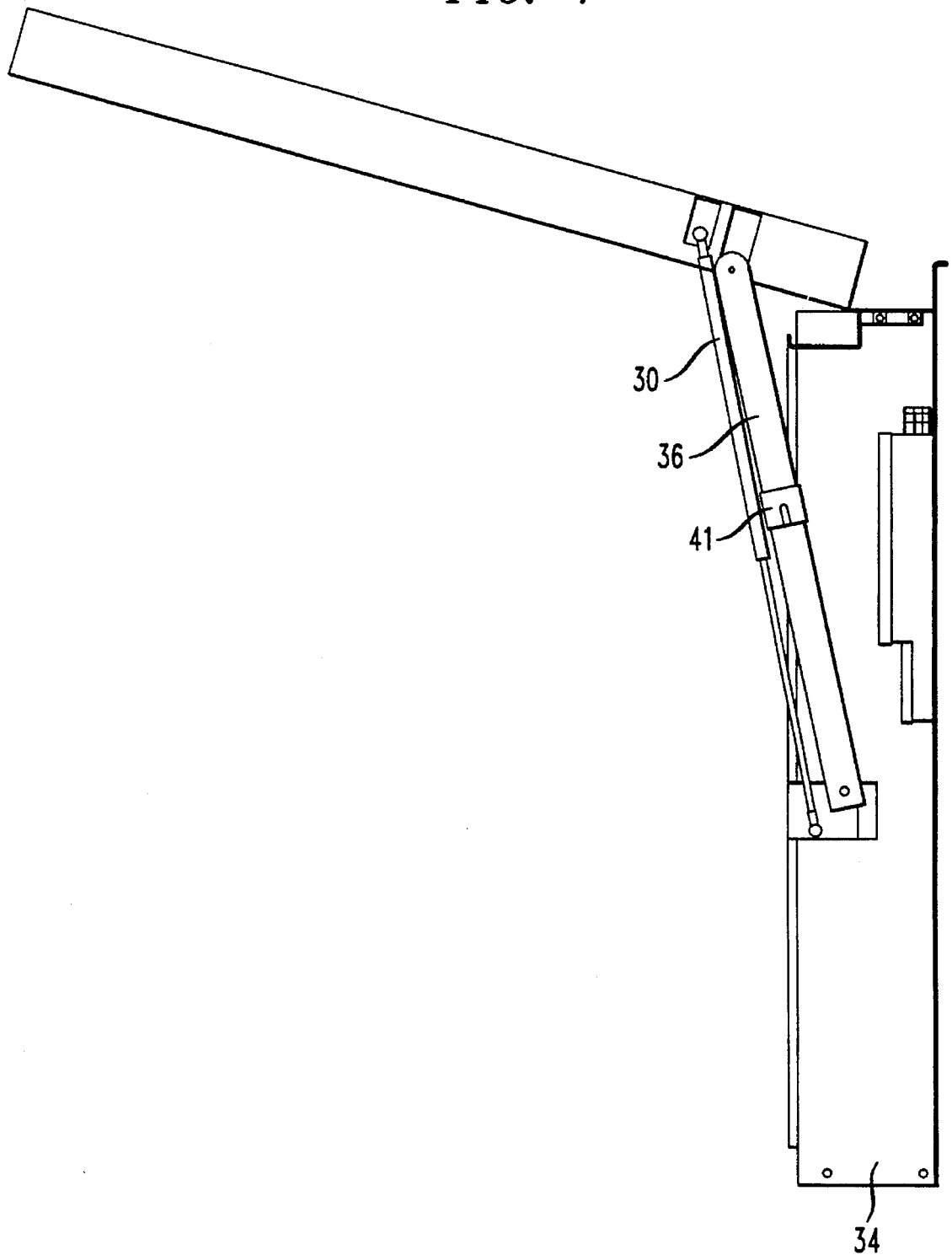

As illustrated in FIGS. 2–4, the doors, 13, are held in an open position by a combination of elements. A pair of hydraulic cylinders, 30 and 31, are mounted between respective flanges, 32 and 33, of the door and respective inside surfaces, 34 and 35, of the frame, 20. In this example, the cylinders are standard nitrogen gas cylinders which are commercially available, such as those sold by Suspa, Inc. under the designation Type 16-4. The cylinders could also be filled with a fluid other than nitrogen. As illustrated in FIGS. 3–4, as the door is opened, the cylinders will extend in length, assist in the opening of the door, and provide resistance to the closing of the door due to the fluid within the cylinders. These cylinders should provide enough resistance to keep the doors opened in most situations.

It is desirable, however, to protect the craftsperson from the door closing, for example, in the event the cylinders fail, or if a high wind exerts sufficient force to overcome the resistance of the cylinders. Thus, special door stays, 36 and 37, are mounted between the doors, 13, and the frames in an area adjacent to the cylinders. The door stays are designed to extend in length as the door is opened and to latch when the door is opened to specified angles. In this example, the stays, 36 and 37, will first latch when the door is at approximately a 45 degree angle with the frame (FIG. 3), and latch again at approximately 10 degree intervals thereafter until the door is opened to its fullest extent at 105 degrees (FIG. 4). At each latching point, the door cannot be closed without mechanically disengaging the latching mechanism, in this example, by pressing latch 41 inward.

Figure 5:
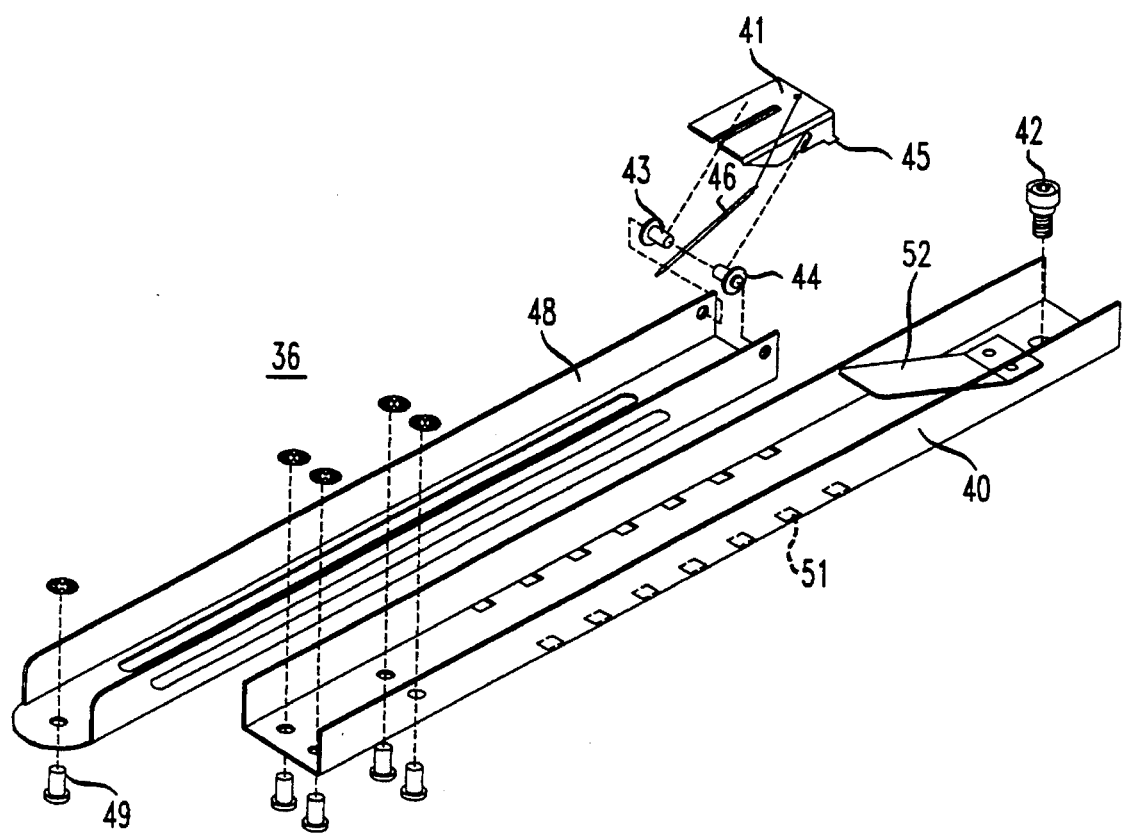
FIG. 5 is an exploded view of a door stay included with the cabinet illustrated in FIG. 1–4.

A door stay, 36, in accordance with this embodiment is illustrated in the exploded view of FIG. 5. The stay includes a sleeve, 40, one end of which is mounted to the door frame by means of a collar shoulder screw, 42. The sleeve, 40, has a rectangular cross section, but the cross section could be square or tubular. A plurality of pairs of apertures, 50 and 51, are formed on the bottom surface of the sleeve 40.

An extension member, 48, is slidably mounted to the inside surface of the sleeve 40 and, at one end, is mounted to the door by means of a pin, 49. A latch, 41, is mounted to the side surfaces of the extension member 48 so as to pivot about pins 43 and 44. The latch includes a pair of pawls, only one of which, 45, is visible, at one end thereof. A latch spring, 46, has one end mounted to the bottom surface of extension member 48 and its opposite end mounted to the latch 41.

In operation, as the door is opened, the extension member, 48, will slide outwardly relative to the sleeve 40 successively uncovering each pair of apertures (e.g., 50 and 51). When each pair of apertures is uncovered, the pawls (e.g., 45) of latch 41 will be forced into the apertures by the action of the latch spring 46, thereby preventing backward movement of the extension member 48. Thus, the stay is latched at selected positions corresponding to the desired angles of opening for the door. For example, apertures 50 and 51 will be engaged by the latch 41 when the door is opened at approximately a 45 degree angle (FIG. 3).

In order to release the latch and permit the extension member to be retracted, a force is applied (e.g., by hand) to the latch at the end opposite to the pawls (45) to pivot the latch in a counterclockwise direction and free the pawls (e.g., 45) from the apertures (e.g., 50 and 51). A tab, 52, is included at one end of the sleeve to reset the latch 41 when the extension member is retracted.

It will also be noted that the doors (13) include flanges, 32, 33 and 60, on three sides to provide strength to the doors to keep them from sagging while in an opened position.

Various modifications will become apparent to those skilled in the art. All such variations which basically rely on the techniques through which the invention has advanced the art are properly considered within the scope of the invention.

We claim:

1. A cabinet comprising:

means for mounting electronic components in the interior of the cabinet;

a door for providing access to the interior thereof, the door being mounted to a top portion of a door frame mounted to the cabinet so as to open in an essentially vertical direction;

a hydraulic member mounted to the door, the hydraulic member extending in length when the door is in an opened position to assist in opening the door and to provide resistance to the closing of the door; and a door stay mounted to the door, which door stay is separate from the hydraulic member and extends in length as the door is opened and is latched in at least one position corresponding to a selected angle of the door to the frame as the door is opened so as to prevent the door from closing in the event that the resistance provided by the hydraulic member is insufficient to keep the door at that angle.

2. The cabinet according to claim 1 wherein the door comprises a flat surface with flanges extending from three sides to provide strength to the flat surface.

3. The cabinet according to claim 1 wherein the door is mounted to the frame by means of a hinge which is set back from a front portion of the frame.

4. The cabinet according to claim 3 wherein a trough is formed at the front portion of the frame in order to receive rain flowing from the door while the door is in an opened position.

5. The cabinet according to claim 4 wherein the trough is covered by the door while the door is in a closed position.

6. The cabinet according to claim 1 wherein electronic equipment is mounted within the interior thereof.

7. The cabinet according to claim 1 wherein the door opens to a maximum angle of approximately 105 degrees with the frame.

8. The cabinet according to claim 1 wherein the stay comprises:

an extension member slidably mounted to a sleeve so as to extend from the sleeve as the door is opened, said sleeve including a series of apertures;

a latch which engages the apertures as the extension member extends from the sleeve and thereby prevents the member from being retracted; and means for releasing the latch so that the extension member can be retracted when it is desired to close the door.

9. The cabinet according to claim 8 wherein the stay further comprises means for resetting the latch when the extension member returns to a fully retracted position in the sleeve.

* * * * *